United States Patent
Pryakhin et al.

(10) Patent No.: US 8,645,052 B2
(45) Date of Patent: Feb. 4, 2014

(54) MOTOR VEHICLE ACCELERATION DETERMINING SYSTEM

(75) Inventors: Alexey Pryakhin, München (DE); Sebastian Kluge, München (DE); Peter Kunath, München (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 212 days.

(21) Appl. No.: 13/021,145

(22) Filed: Feb. 4, 2011

(65) Prior Publication Data

US 2011/0196817 A1 Aug. 11, 2011

(30) Foreign Application Priority Data

Feb. 5, 2010 (EP) .................................. 10001189

(51) Int. Cl.
 *G01C 22/00* (2006.01)
 *G05D 1/00* (2006.01)
 *G06F 19/00* (2011.01)

(52) U.S. Cl.
 USPC ............................. 701/123; 701/24; 701/26

(58) Field of Classification Search
 USPC ................................... 701/24, 26, 123
 See application file for complete search history.

(56) References Cited

U.S. PATENT DOCUMENTS

| | | | |
|---|---|---|---|
| 7,706,964 B2 * | 4/2010 | Horvitz et al. | 701/117 |
| 8,155,868 B1 * | 4/2012 | Xing et al. | 701/123 |
| 8,239,127 B2 * | 8/2012 | Kono et al. | 701/123 |
| 2006/0058954 A1 | 3/2006 | Haney | |
| 2008/0004789 A1 | 1/2008 | Horvitz et al. | |
| 2011/0172864 A1 * | 7/2011 | Syed et al. | 701/22 |

FOREIGN PATENT DOCUMENTS

| | | |
|---|---|---|
| JP | 2019-217813 | 9/2010 |
| WO | WO 2008/112335 A1 | 9/2008 |

OTHER PUBLICATIONS

Abou-Zeid, Maya, et al.; Probabilistic Modeling of Acceleration in Traffic Networks as a Function of Speed and Road Type; IEEE 5th International Conference on Intelligent Transportation Systems; pp. 1-18.

Greenwood, I.D., et al.; Estimating the Effects of Traffic Congestion on Fuel Consumption and Vehicle Emissions Based on Acceleration Noise; Journal of Transportation Engineering SSCE; Feb. 2007; pp. 96-103.

Ericsson, Eva; Independent Driving Pattern Factors and Their Influence on Fuel-Use and Exhaust Emission Factors; 2001 Elsevier Science Ltd. pp. 345-345.

* cited by examiner

*Primary Examiner* — Mary Cheung
*Assistant Examiner* — Frederick Brushaber
(74) *Attorney, Agent, or Firm* — O'Shea Getz P.C.

(57) ABSTRACT

Systems and methods for analyzing acceleration as a road segment characteristic in a vehicle are provided for determining information about a route including for example, the estimated fuel consumption of the route. An example of a system includes a data storage medium for storing map data having road segments, a bus interface to a data bus for receiving measured values of a velocity or an acceleration from a velocity or acceleration sensor, a position data receiver configured to receive position data for determining a current position, and a system controller. The system controller is configured to identify a road segment associated with the current position. The system controller retrieves parameters of a probability distribution of acceleration associated with the identified road segment from the data storage medium. Updated parameters of the probability distribution of acceleration are determined from the measured values of the velocity or acceleration.

18 Claims, 3 Drawing Sheets

# MOTOR VEHICLE ACCELERATION DETERMINING SYSTEM

RELATED APPLICATIONS

This application claims priority of European Patent Application Serial Number 10 001 189.9, filed on Feb. 5, 2010, titled SYSTEM FOR A MOTOR VEHICLE AND METHOD FOR DETERMINING ACCELERATIONS, which application is incorporated in its entirety by reference in this application.

BACKGROUND

1. Field of the Invention

The present invention relates to systems for monitoring motor vehicle parameters, and more particularly to systems and methods for determining acceleration.

2. Related Art

Motor vehicles having navigation systems with route determining and tracking capabilities are generally widely available. Some systems may include features that assist the driver in conserving fuel by determining routes based on fuel efficiency. In one example, a navigation system may determine suggested routes having an estimated minimum fuel usage for a vehicle. The routes may be based on an estimated fuel efficiency of the vehicle, different speeds of the vehicle, and on estimated speeds for the route. The estimated fuel efficiency for the vehicle may also be based on aggregated data for the vehicle, or alternatively, on actual data for the vehicle.

Accurate fuel efficiency estimates for specific roads may be difficult to determine. Fuel consumption may depend on many different factors relating to the driver's route preferences and real-time route information, which includes current traffic conditions, current accident reports, weather information, current construction sites, and other similar data. Some implementations have addressed these constraints by estimating fuel usage based on actual driver behavior data.

Route determining systems may analyze the driver's behavior by determining, for example, whether a driver regularly speeds, accelerates fast, or drives in other ways that would expend more fuel than a typical driver. The route determining system may then use the data in estimating parameters associated with fuel expenditure.

In some implementations, route determining systems may infer road speeds and provide context-sensitive routing. Such systems assume road speeds to be functions of the properties or classes of roads (for example, two lane, four lane, expressway, state highway, or county highway), the area surrounding the roads (for example, commercial, residential, or agricultural), the terrain around the road, posted speed limits, nearby resources (for example, shopping areas, recreational parks, and other resources), and other suitable data. Other sources of information may also be used, including weather information, relationships among roads, road types, and traffic conditions, and special geometric relationships between types of roads (for example, the distance between a road segment from a freeway on-ramp or off-ramp). A limited set of sensed data may also be used to deduce road speeds. Statistical methods may be used to analyze the data relating to the road segments and the limited sensed data and to arrive at context-sensitive estimates of velocities on the road segments.

Route determination systems have implemented ways to increase the accuracy of fuel efficiency determination and other characteristics that may be affected by driver behavior, road conditions, time-related conditions, and other factors. Nevertheless, the potential for substantial inaccuracies remains. Conventional navigation systems typically use static parameters when determining and making use of fuel consumption estimates. Static parameters, such as, for example, distance, number of curves and maximum or average velocity, may not be sufficient to determine the fuel consumption of a car on a road segment, particularly in dynamically changing traffic situations.

There is a need for improvements in analyzing driving conditions to more accurately assess performance factors such as fuel consumption.

SUMMARY

Systems and methods for analyzing acceleration as a road segment characteristic in a vehicle are provided for determining information about a route including, for example, the estimated fuel consumption of the route. An example of a system includes a data storage medium for storing map data having road segments, a bus interface to a data bus for receiving measured values of a velocity or an acceleration from a velocity or acceleration sensor, a position data receiver configured to receive position data for determining a current position, and a system controller. The system controller is configured to identify a road segment associated with the current position. The system controller retrieves parameters of a probability distribution of acceleration associated with the identified road segment from the data storage medium. Updated parameters of the probability distribution of acceleration are determined from the measured values of the velocity or acceleration.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1A:
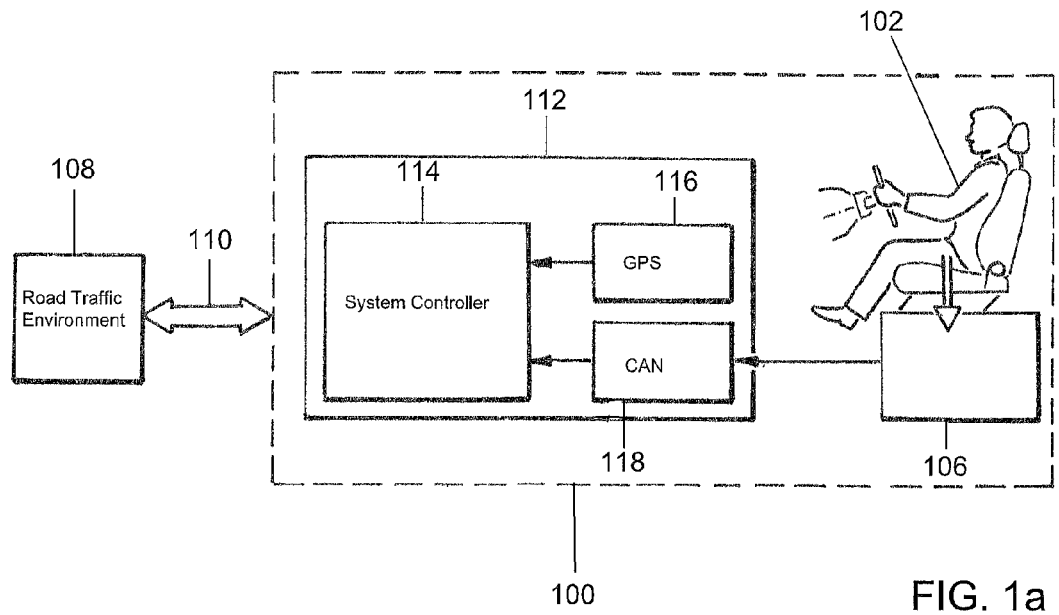
FIG. 1A is a schematic diagram of an example of a system of the present invention for monitoring and guiding a driver in a motor vehicle.

FIG. 1A is a schematic diagram of an example of a system of the present invention for monitoring and guiding a driver in a motor vehicle. FIG. 1A shows a motor vehicle 100 and a driver 102 operating the motor vehicle 100 via a drive and control system 106. The motor vehicle 100 is shown in schematic block diagrams to be located in a road traffic environment 108. The driver 102 interacts with the road traffic environment 108 via conditions 110, which may include traffic rules and physical limit conditions.

The motor vehicle 100 may include a monitoring and guiding system 112 for monitoring road and vehicle conditions and for guiding the driver 102. The monitoring and guiding system 112 may be a navigation system, or a similar system. The monitoring and guiding system 112 includes a system controller 114, a GPS receiver 116 and a bus interface 118 for communicating to a vehicle bus (such as for example, a CAN bus) and to the system controller 114. The system controller 114 may input data relating to the motor vehicle 100 via the bus interface 118. The system controller 114 may input position data obtained from a GPS sensor via a GPS receiver 116.

Figure 1B:
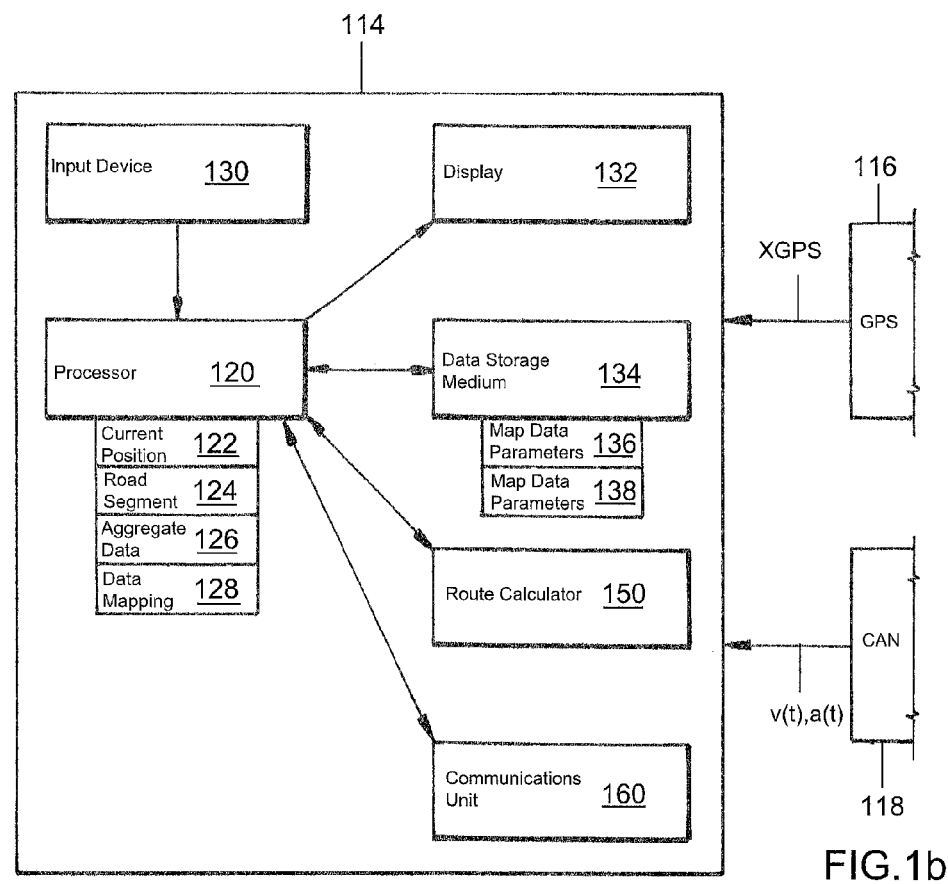
FIG. 1B is a block diagram of an example of a system control device that may be used in the system of FIG. 1A.

FIG. 1B is a block diagram of an example of a system control device that may be used in the system of FIG. 1A. The system controller 114 of FIG. 1B may include a central processor 120, an input device 130, a display 132, a data storage medium 134, a route calculator 150, and a communications unit 160 that may be used, for example, for wireless communication.

The data storage medium 134 of the system controller 114 may include a parameter data block 138 for storing vehicle parameters and measured data, and a map data block 136 for storing map data in the data storage medium 134. The system controller 114 is connected to a data bus (such as a CAN) via the bus interface 118 as shown in FIG. 1A, and is configured to receive measured (or sensed) values including the vehicle velocity v(t) and vehicle acceleration a(t). The system controller 114 also communicates with the GPS receiver 116 to obtain position data XGPS, using satellite or other signals. The system controller 114 is configured to use the obtained position data as well as the measured values in navigation-related functions.

The central processor 120 may be configured to perform multiple navigation-related functions such as: a current position determining function 122, a road segment detecting function 124, a data aggregating function 126, and a data mapping function 128. The current position determining function 122 determines the current position of the vehicle using position data XGPS obtained from the GPS receiver 116. The central processor 120 includes the road segment detecting function 124 to determine a current road segment on the basis of the current position and the map data 136. The measured values of the velocity v(t) and acceleration a(t) may be combined using the data aggregating function 126.

The complex movement of a vehicle in traffic flow affects the driver's overall travel time and the amount of fuel that will be needed to drive through a road segment. The monitoring and guiding system 112 includes a compact mathematical description of the movements of the vehicle 100. The mathematical description is compact in that it may be implemented to operate in limited storage space in the data storage medium 134 of the system or in an external database connected to the monitoring and guiding system 112. The compact mathematical description of the movement of a vehicle may include acceleration curves or distributions that describe not only average dynamics but also micro-dynamics of a vehicle in traffic flow according to the traffic situation. Average speed parameters may also be included in the description.

The monitoring and guiding system 112 of FIG. 1B includes a model that describes the movement of a single vehicle in a certain traffic situation on a given road segment. The model is mapped by the data mapping function 128, which loads parameters of a probability distribution of acceleration of the motor vehicle 100 from the data storage medium 134 to perform navigation functions, such as for example, to calculate route information. The parameters map a dynamic of positive and/or negative accelerations within a road segment. The frequency and intensity of accelerations within the determined road segment are covered by the parameters. The parameters make it possible to display a curve or a progression of accelerations within the determined segment.

At least one parameter may be a measure of statistical dispersion of acceleration. Common examples of measures of statistical dispersion of acceleration are the variance, standard deviation, and interquartile range. The measure of statistical dispersion makes it possible to map the dynamics of the acceleration within the road segment. In an example implementation, fuel consumption may be more precisely determined using calculations based on the measure of statistical dispersion as a parameter of the probability distribution of acceleration. Examples may use any suitable probability distribution including, for example, a normal distribution or a Laplace distribution. In the case of a normal distribution of acceleration, the parameters may include the variance and the mean acceleration. A distribution of velocity or an average velocity within the road segment may also be used.

The monitoring and guiding system 112 of FIG. 1B performs calculations for road segments based on road segment data. The road segment data may assign each road segment to a class of road segments. The road segments may be organized as a preset number of classes. The classification of road segments may be implemented differently depending on the country in which the vehicle is being driven. In an example implementation, the road segments may be assigned a measure of significance within a given route. For example, a long-distance road segment, such as a freeway, highway, national highway or regional road may be assigned a maximum significance. A short-distance road segment between two cities or towns may be assigned a second highest significance. Road segments may also be classified by speed limits, or legally permissible maximum velocities. For example, road segments may be divided into roads having speed limits of: unlimited, 130 km/h, 120 km/h, 100 km/h, 50 km/h, etc. Road segments may also be classified by dividing the road segments according to the road's geometric features. For example, roads may be classified by number of curves, uphill gradient, downhill gradient, and other suitable features. Road segment classifications may also be made by combinations of characteristics.

The parameters of the probability distribution of acceleration may be determined using the velocity measurements or acceleration measurements and stored in the data storage medium 134 as default values for each class of road segments. The default values of the acceleration distribution parameters may be measured and calculated for each class of road segments using test trips of one or more vehicles. Accordingly, acceleration distribution parameters may be assigned to the class that includes the road segment(s) and, segment-specific parameters may be assigned to a specific road segment. In an example implementation 8×8×8 classes may be defined.

The fuel consumption for a specified route may be calculated as route information on the basis of the parameters of the probability distribution of acceleration. A process for determining fuel consumption may also use other factors such as, for example, the vehicle model and the driver's gear shifting behavior. The fuel consumption may be displayed to the user on the display 132. The fuel consumption determined on the basis of the parameters of the probability distribution of acceleration may also be used to calculate a route for the user. For example, the fuel consumption may be used to find the route having the lowest total fuel consumption or the most favorable route having a filling station within a calculated range.

The process for determining a route may also factor, for example, the strain on the driver due to the number of acceleration and braking operations. The strain due to acceleration and braking may be calculated using the parameters of the probability distribution of acceleration. The strain on the driver may also be graphically displayed to the driver on the display 132 as a strain index. The average velocity for a route may also be determined and displayed on the basis of the parameters.

Examples of implementations of the monitoring and guiding system 112 in FIGS. 1A and 1B may incorporate a more accurate description of the actual accelerations within a road segment or class of road segments than other systems that use purely static map data such as distance, number of curves, and maximum or average velocity. The monitoring and guiding system 112 may obtain the more accurate descriptions using the plurality of measured values within the road segment and of the calculation of the parameters of the probability distribution of acceleration.

The parameters of the probability distribution of acceleration may also be used in controlling the vehicle's drive-train while travelling on a road segment to optimize drive-train efficiency and travelling comfort. For example, when a greater variance of acceleration is determined in a specific road segment, the drive-train may be controlled to generate more dynamic driving power by changing, for example, the pressure and/or air-fuel ratio.

In an example of the implementation illustrated in FIG. 1B, the parameters for each class of road segments are stored as default values in the data storage medium 134. The system controller 114 of the monitoring and guiding system 112 may also be configured to continuously adapt the parameters for a specific road segment or for a class of road segments on the basis of the measured values v(t) and a(t) of the motor vehicle 100. The system controller 114 may thus perform as an adaptive, or self-learning, system controller 114 with regard to the parameters of the probability distribution of acceleration.

The utility and descriptive capability of the parameters of the probability distributions of acceleration may be enhanced by adaptively estimating the parameters using driving data collected 'on-the-fly' in the system controller 114 installed in the vehicle. By adaptively estimating parameters, the variance of the parameters associated with an aggressive driver will be more significant than that of a calm driver. The increased variance may result in a greater fuel consumption, which may be determined using the adaptive estimation of the parameters.

The system controller 114 may also be configured to determine current parameters of a current probability distribution of accelerations on the basis of measured values of the velocity, v(t), and the acceleration, a(t), in a road segment. These measured parameters may differ from the existing parameters. Updated parameters may be calculated on the basis of both the parameters stored in the data storage medium 134 and the current parameters determined through measurement. In an example implementation, updated parameters may be calculated on the basis of the parameters stored in the data storage medium 134 and the measurement values by using a recursive function. Updated parameters may be assigned to the road segment stored in the data storage medium 134 as the parameters are updated. The updated parameters may also be used in calculating the route information as the parameters become available.

Figure 2:
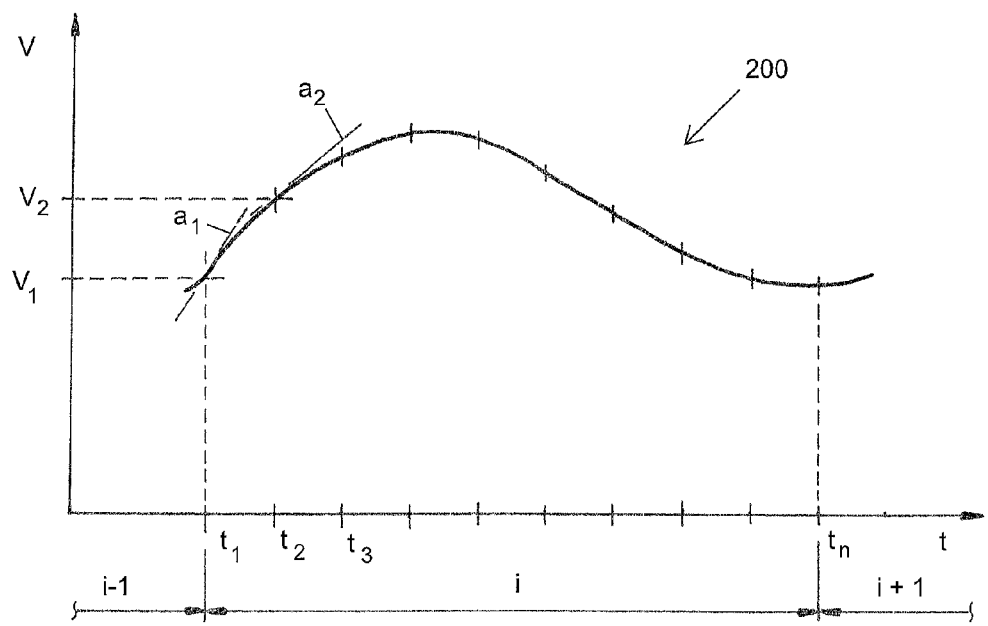
FIG. 2 is a graph illustrating examples of velocity and acceleration curves plotted over time.

FIG. 2 is a graph 200 illustrating examples of velocity and acceleration curves plotted over time. The curves include measured values v1, v2, a1, a2 over time for a road segment i. The measured values for the preceding road segment i−1 and for the subsequent road segment i+1 are not shown. The measured values v1, v2, a1, a2, are ascertained at discrete measuring time points t1, t2, to in equal time intervals of 1/10 of a second. The measuring time points are included in a time period having a resolution of, for example, one hour. The time period resolution may alternatively be morning/afternoon or day/night. An indication may also be made of whether the day is a working day for purposes of processing the measured values.

The time period of the measurement may be determined and used to characterize the measurements. For example, the time period of the measurements may be noted as the time of the day and the day of the week, or assigned to a working day or to a non-working day in order to take into account typically deviating traffic volumes on working days. An assignment to a calendar month is also possible in order to take into account statistical weather influences. Parameters of the probability distribution of accelerations may be stored according to time periods in addition to road segments or class of road segments.

As shown in FIG. 2, the velocity may be measured as v1 at time point t1 and v2 at time point t2, and the acceleration may be measured as a1 at time point t1 and a2 at time point t2. The values v1, v2, a1, a2 may be measured by the vehicle speed and acceleration sensors and transmitted over a data bus to the monitoring and guiding system 112. The measured values may be transmitted via a CAN-Bus and received at the bus interface 118 of the monitoring and guiding system 112 as shown in FIGS. 1A and 1B. It is noted that FIG. 2 shows a relatively small number of measured values for purposes of illustration. In example implementations, a much larger number of measured values may typically be ascertained for a road segment i.

Figure 3:
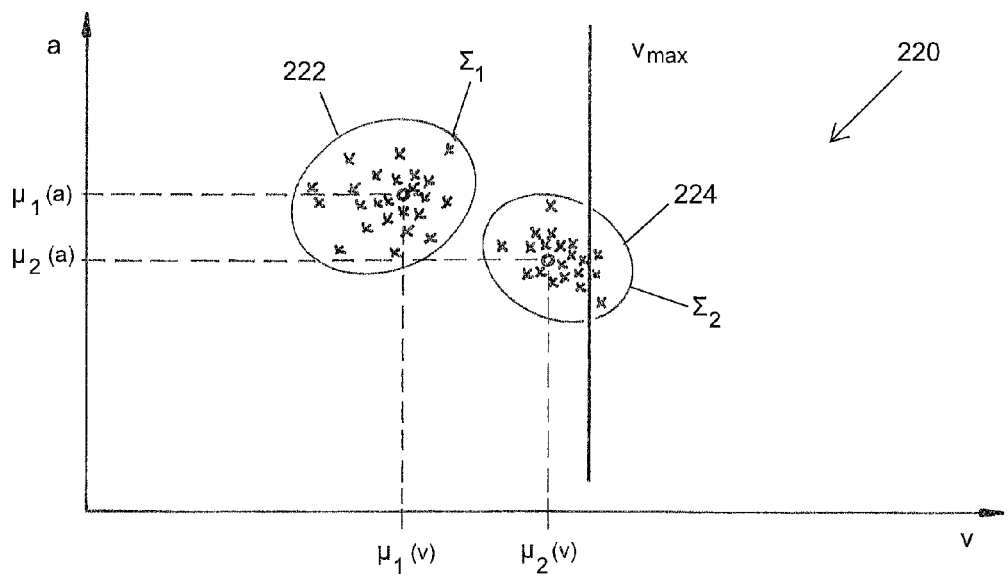
FIG. 3 is a graph illustrating an example of a two-dimensional probability distribution.

FIG. 3 is a graph 220 illustrating an example of a two-dimensional probability distribution used in evaluating measured values. The measured values (v1, a1) . . . , (vn, an) are interpreted as instances of a random vector $\bar{x}=(v, a)$. The individual values of x are illustrated by a cross to which a value of an acceleration a and a value of a velocity v are assigned. The legally permissible maximum velocity vmax in the subject road segment i is also shown in FIG. 3.

FIG. 3 shows two probability distributions 222 and 224, which are dependent on the traffic volume on the road segment i. The two probability distributions may be described as $$(v,a) \sim \lambda \cdot N(\mu_1, \Sigma_1) + (1-\lambda) \cdot N(\mu_2, \Sigma_2) \tag{1}$$

Where:

$$\lambda \in \{0,1\} \text{ is used for concrete numbers, or} \tag{2a}$$

$$\lambda \in [0,1] \text{ is used for a range from zero to one.} \tag{2b}$$

The parameter $\lambda$ in Equation (1) is an overlay parameter that represents the probability of a (moderate) traffic volume. The parameter $\lambda$ within the road segment i is assumed to be constant. The function $N(\mu, \Sigma)$ in Equation (1) is a two-dimensional normal distribution. The parameters of $N(\mu, \Sigma)$ are $\mu, \Sigma$, which include the expectation value vector $\mu(\bar{x})$ and the covariance matrix $\Sigma$ of the two-dimensional normal distribution. The values corresponding to the first covariance matrix, $\Sigma_1$, in FIG. 3 are indicated as values for a moderate traffic volume. The values corresponding to the second covariance matrix, $\Sigma_2$, are indicated as values for freely moving traffic. The graph in FIG. 3 shows that, although the average velocity $\mu_2(v)$ is higher for the second probability distribution of freely moving traffic, $\Sigma_2$, the average acceleration value $\mu_2(a)$ and the dynamic of accelerations is lower. These results indicate that the fuel consumption in moderate traffic is expected to be significantly higher, a conclusion that may not be apparent by analysis of average velocities or other static parameters.

The probability distributions used in modeling travel along a given road segment i may be determined by performing a plurality of test trips in the road segment i. The test trips may be conducted using a test vehicle to gather road data that may be used to calculate the probability distribution. The parameters of the calculated probability distribution for road segment i may be transmitted to a central computer. In an example implementation, the parameters may be transmitted to the central computer via communications unit 160 (in FIG. 1B). The central computer may compile the parameters of the probability distributions for road segment i, and for any other road segments. The parameters of the probability distribution for the road segments may then be sent to the monitoring and guiding system 112 in all vehicles in a fleet of vehicles in the form of an update.

In other implementations, a probability distribution of acceleration for a fixed set of frequencies $f_k$ may be calculated as:

$$f_k = \frac{k\pi}{10\ s}, k = 1, \ldots, 5 \quad (3)$$

The velocity curves may be defined locally in road segment i as:

$$v^i(t) = v_0^i + \sum_{k=1}^{5} A_k^i \sin(f_k t) \quad (4a)$$

where:
s is time in seconds,
$v_0$ is the average velocity, and
$A_k$ is the amplitude for each acceleration.

Equation (4a) may be used for a time interval ranging from zero to five seconds. In another example implementation, Equation (4b) below may be more suitable for a time interval from zero to ten seconds:

$$v^i(t) = v_0^i + A_0^i t + \sum_{k=1}^{5} A_k^i \sin(f_k t) \quad (4b)$$

The coefficients $(v_0^i, A_0^i, A_1^i, A_2^i, A_3^i, A_4^i, A_5^i)$ in Equation (4b) may be determined in road segment i and designated as random vector $\overline{x} = (v_0, A_0, A_1, A_2, A_3, A_4, A_5)$ for the road segment i. The combination of amplitude and frequency is correlated to an intensity of acceleration in which a negative indicates braking and positive indicates accelerating. Where driving maneuvers with a duration of 2 to 10 seconds are considered. Equation (4b) indicates a significant decay behavior in amplitudes $A_k$ for increasing k. The probability distribution having random variable $\overline{x} = (v_0, A_0, A_1, A_2, A_3, A_4, A_5)$ is similar to the probability distribution of $\overline{x} = (v, a)$, which may be restated as: $v \approx v([0,10s])$, $a \approx dv/dt([0,10s])$, which may be simplified as: $v \approx v_0, A_k \approx a$.

It is noted that a normal distribution or the Laplace distribution may also be used as multidimensional probability distributions.

Figure 4:
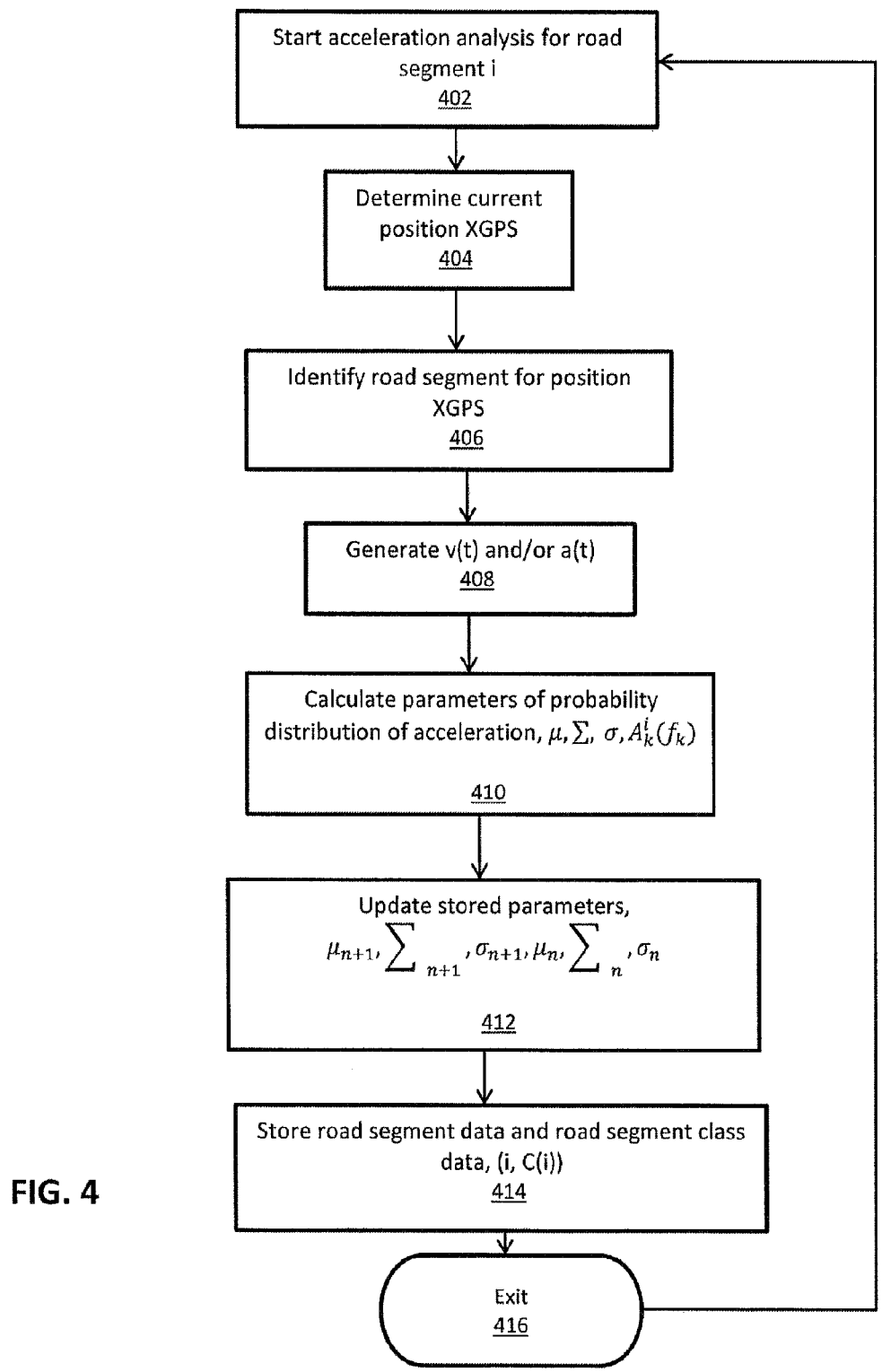
FIG. 4 is a flow chart illustrating operation of an example method for analyzing acceleration in accordance with the present invention.

FIG. 4 is a flow chart illustrating the operation of an example method 400 for analyzing acceleration. The method 400 illustrated in FIG. 4 may be performed in a motor vehicle that uses a monitoring and guiding system such as the monitoring and guiding system 112 shown in FIG. 1A. The method 400 may be performed as the motor vehicle travels along a current road segment i as shown at step 402. In step 404, positioning data is collected from a GPS sensor to determine the vehicle's current position, $X_{GPS}$. In step 406, the current road segment i is identified from the measured position, $X_{GPS}$, and map data that may be obtained for example from the map data 136 in the data storage medium 134 (in FIG. 1B).

In step 408, the measured data is aggregated, and velocity or acceleration curves for the road segment i may be plotted as illustrated in FIG. 2. In step 410, the data may be further aggregated and may also be used to calculate intermediate data. In fifth step 410, the measured values may be used to calculate parameters of a current probability distribution of acceleration. The parameters may depend on the probability distribution used. For example, for a multidimensional normal distribution (as illustrated in FIG. 3), the parameters of the probability distribution function and include the current expectation value vectors $\mu$ and current covariance matrices $\Sigma$. For a current one-dimensional normal distribution, a current expectation value $\mu$ and current standard deviation $\sigma$ may be calculated for the accelerations at a minimum. The parameters calculated in step 410 may also include the coefficients $(v_0^i, A_1^i, A_2^i, A_3^i, A_4^i, A_5^i)$ corresponding to the set of frequencies described above with reference to Equations (3), (4a) and (4b).

In step 412, the calculated parameters may be compared with corresponding parameters $\mu_n, \Sigma_n$ or $\sigma_n$ stored in the data storage medium 134. The stored parameters $\mu_n, \Sigma_n$ or $\sigma_n$ may also be updated by calculating updated parameters $\mu_{n+1}, \Sigma_{n+1}$ or $\sigma_{n+1}$ using the current stored parameters $\mu_n, \Sigma_n, \sigma_n$. In an example implementation, the updated parameters are calculated using recursion as described below, for example, with reference to Equations (5) and (6).

In step 414, the updated parameters $\mu_{n+1}, \Sigma_{n+1}$ or $\sigma_{n+1}$ are stored and assigned to road segment i, or to a class C(i) of road segments. It is noted that the data may be stored and related to the classes of road segments in a variety of ways. The parameters of the probability distribution of acceleration may be associated with the current road segment and stored as a characteristic of the individual road segment i. The parameters may also be assigned to a class of road segments that meet predefined road-specific criteria. The parameters of the probability distribution of acceleration may also be associated with a combination of both the individual road segments and class of road segments by assigning parameters to the individual road segment as well as by assigning parameters to associated classes of road segments. When association of parameters is made in combination and both types of parameters are available, the parameters associated with individual road segments may be given a higher priority and used before the parameters associated with the class of road segments.

To illustrate the updating of the parameters of the probability distribution of acceleration using recursion, an updated parameter, $\mu_{n+1}$, may be derived for acceleration a from the statistical expression for expectation as:

$$\mu_{n+1} = \frac{n}{n+1}\mu_n + \frac{1}{n+1}a_{n+1} \quad (5)$$

Similarly, the updated variance parameter, $\sigma_{n+1}^2$, may be derived from the statistical expression for variance as:

$$\sigma_{n+1}^2 = \frac{n-1}{n}\sigma_n^2 + \mu_n^2 + \frac{1}{n}a_{n+1}^2 - \frac{n+1}{n}\mu_{n+1}^2 \quad (6)$$

where:
n is the number of preceding observations,
$\mu_n$ is the previously calculated mean value for a,
$\sigma_n^2$ is the previously calculated variance for a, and
$a_{n+1}$ is the new acceleration observation.

Updated parameters may also be calculated for the probability distribution of velocity using recursion. An updated parameter, $\mu_{n+1}$, may be calculated for velocity from the statistical expression for expectation as:

$$\mu_{n+1} = \frac{n}{n+1}\mu_n + \frac{1}{n+1}v_{n+1} \quad (7)$$

Similarly, the updated variance parameter, $\sigma_{n+1}^2$, may be derived from the statistical expression for variance as:

$$\sigma_{n+1}^2 = \frac{n-1}{n}\sigma_n^2 + \mu_n^2 + \frac{1}{n}v_{n+1}^2 - \frac{n+1}{n}\mu_{n+1}^2 \quad (8)$$

where:
n is the number of preceding observations,
$\mu_n$ is the previously calculated mean value for v,
$\sigma_n^2$ is the previously calculated variance for v, and
$v_{n+1}$ is the new velocity observation.

As shown by Equations (5), (6), (7), and (8), the expectation vector $\underline{\mu}_n$ and covariance matrix $\rho_n$ may be used in calculations involving multidimensional probability distributions.

The updated parameters $\mu_{n+1}, \Sigma_{n+1}$ or $\theta_{n+1}$ are stored in step 414 and used as the stored parameters in the next update. A reliability indicator may also be stored to provide an indication of the reliability of the parameters when used in subsequent calculations, which may include, for example, calculations relating to fuel consumption. The reliability indicator may be based on any one of a variety of different conditions. For example, the reliability indicator may be based on the difference between the current value of expectation vector $\underline{\mu}_{n+1}$ and the stored expectation vector $\underline{\mu}_n$. The reliability indicator may also involve storing or evaluating the number of measurements, n. The reliability indicator would then be a factor in Equations (5) and (6) as the variable n when the next values for the acceleration a are measured for a given road segment i. The reliability indicator would also factor in Equations (7) and (8) as variable n when the next values for the velocity v are measured for a given road segment i.

In step 416, the processing for the road segment i terminates. As the vehicle leaves road segment i and enters a new road segment i+1, the process may be repeated for the new road segment i+1 staring back with step 402.

It will be understood, and is appreciated by persons skilled in the art, that one or more processes, sub-processes, or process steps described in connection with FIGS. 1-4 may be performed by hardware and/or software. If the process is performed by software, the software may reside in software memory in a suitable electronic processing component or system such as, one or more of the functional components or modules schematically depicted in FIGS. 1-4. The software in the software memory may include an ordered listing of executable instructions for implementing logical functions (that is, "logic" that may be implemented either in digital form such as digital circuitry or source code), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, a probability distribution function other than the normal distribution or the Laplace distribution may be used in the example implementations. Other route information may also be generated, either for a new calculation or for display to the user. Many other variations are also possible. The claims and their equivalents define the scope of the invention.

What is claimed is:

1. A method for analyzing accelerations as a road segment characteristic in a vehicle, the method comprising:
   identifying a road segment from map data based on a current position;
   measuring a plurality of acceleration values or a plurality of velocity values within the identified road segment;
   reading stored parameter data indicative of a probability distribution of acceleration associated with the identified road segment from a memory device;
   calculating updated parameter data indicative of a probability distribution of acceleration with the identified road segment using the stored parameter data and at least one of the plurality of acceleration values or the plurality of velocity values;
   storing the updated parameter data indicative of the probability distribution in the memory device;
   determining a reliability indicator in addition to the calculated updated parameter data; and storing the calculated updated parameter data indicative of the probability distribution of acceleration with the reliability indicator associated with the calculated updated parameter data.

2. The method of claim 1 where the map data includes classes of road segment, the road segments of each class having identical preset road-specific criteria, the method further comprising:
identifying at least one class associated with the identified road segment; and
storing the updated parameter data indicative of the probability distribution of acceleration for the road segment or for the class associated with the identified road segment.

3. The method of claim 2 further comprising:
assigning the stored parameter data to the identified class of the road segment; and
calculating the updated parameter data for the identified class.

4. The method of claim 1 further comprising:
calculating the updated parameter data using recursion; and
using the measured acceleration values or velocity values of the identified road segment and the stored parameter data in the recursion.

5. The method of claim 1 further comprising:
calculating current parameter data indicative of a current probability distribution of acceleration from the measured plurality of acceleration values or the plurality of velocity values; and
calculating the updated parameter data indicative of the probability distribution of acceleration from the current parameter data and the stored parameter data.

6. The method of claim 1 further comprising:
assigning the stored parameter data to the road segment; and
using the stored parameter data to calculate the updated parameter data for the identified road segment.

7. The method of claim 1 further comprising:
assigning the updated parameter data indicative of the probability distribution to different traffic volumes using a traffic-related parameter of the probability distribution of accelerations, the traffic-related parameter being based on the density of the traffic within the identified road segment, the traffic-related parameter being estimated from the plurality of acceleration values or the plurality of velocity values or received traffic data.

8. The method of claim 1 further comprising:
calculating fuel consumption estimates for the identified road segment using the updated parameter data indicative of the probability distribution stored in the memory device.

9. A system for analyzing acceleration as a road segment characteristic in a vehicle comprising:
a memory device for storing map data having road segments;
a bus interface to a data bus for receiving measured values of a velocity or an acceleration from a velocity or acceleration sensor;
a position data receiver configured to receive position data for determining a current position;
a system controller configured to identify a road segment associated with the current position, to use parameter data indicative of a probability distribution of acceleration stored in the memory device where the parameter data is associated with the identified road segment, and to determine updated parameter data of the probability distribution of acceleration from the measured values of the velocity or acceleration, and to determine a reliability indicator in addition to the calculated updated parameter data, and storing the calculated updated parameter data indicative of the probability distribution of acceleration and the reliability indicator associated with the calculated updated parameter data.

10. The system of claim 9 where the system controller is configured to determine information for a route having at least the identified road segment based on the parameter data indicative of the probability distribution of acceleration.

11. The system of claim 10 where the information determined by the system controller includes an estimated fuel consumption for the route.

12. The system of claim 9 where:
the system controller retrieves the parameter data indicative of the probability distribution of acceleration which are associated with the road segment of the current position; and
the system controller is configured to control a drive of the vehicle on the basis of the retrieved parameter data indicative of the probability distribution of acceleration.

13. The system of claim 9 where:
the parameter data indicative of the probability distribution of acceleration are either assigned to a specific road segment, or to a class of road segments, the map data having classes of road segments and the road segments that meet a predetermined road-specific criteria associated with each class.

14. The system of claim 9 where:
the system controller is configured to evaluate measured values of the velocity or the acceleration in the identified road segment;
the system controller is configured to calculate updated parameter data indicative of a probability distribution of acceleration based on the parameter data stored in the memory device, and on measured values of the velocity or the acceleration within the road segment; and
the system controller is configured to store the calculated updated parameter data indicative of the probability distribution of acceleration, the updated parameter data being assigned to the identified road segment.

15. The system of claim 9 where the system controller is configured to determine the probability distribution of acceleration according to any multidimensional probability distribution function.

16. The system of claim 15 where the multidimensional probability distribution function is either a normal distribution or a Laplace distribution.

17. The system of claim 9 where the position data receiver comprises a GPS sensor.

18. The system of claim 9 where the bus interface comprises an interface to a CAN bus.

* * * * *